Feb. 20, 1923.
J. C. MILLER.
WHEEL BLOCK.
FILED JULY 22, 1918.
1,446,055.
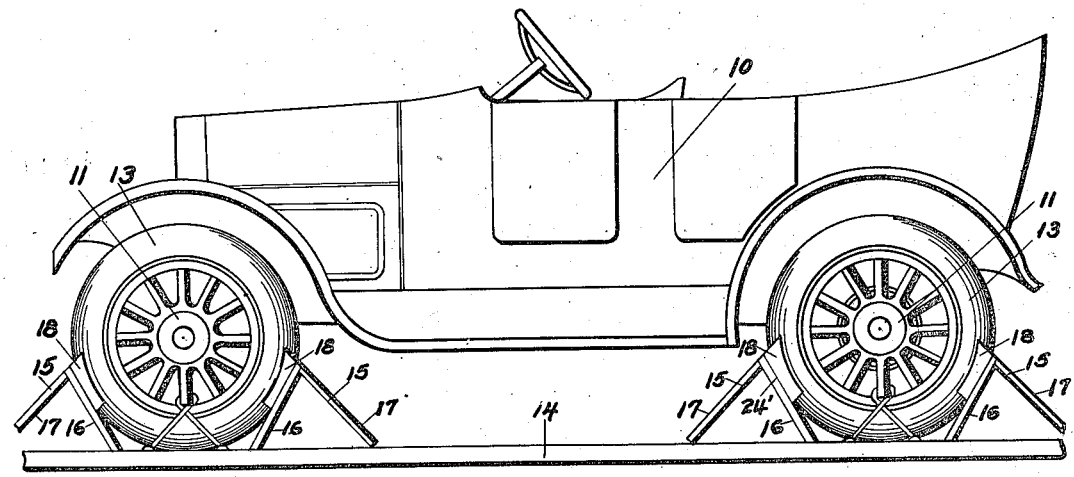
Fig. I.
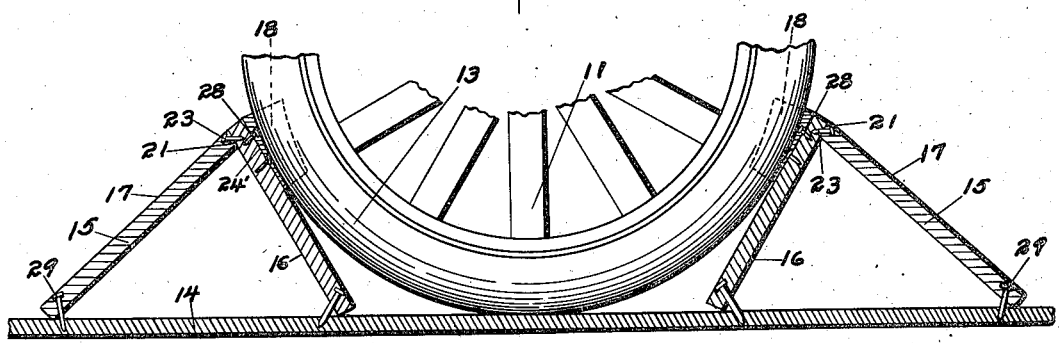
Fig. II.
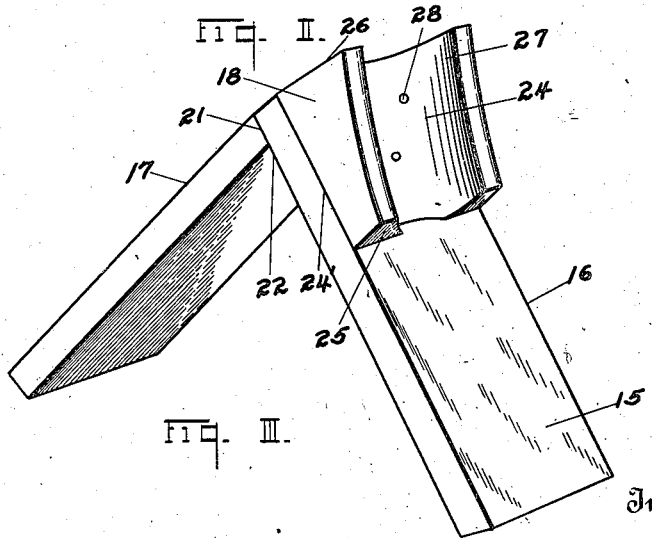
Fig. III.
Inventor
John C. Miller
By Chester H. Braselton
Attorney Patented Feb. 20, 1923.

1,446,055

UNITED STATES PATENT OFFICE.

JOHN C. MILLER, OF TOLEDO, OHIO, ASSIGNOR TO THE WILLYS-OVERLAND COMPANY, OF TOLEDO, OHIO, A CORPORATION OF OHIO.

WHEEL BLOCK.

Application filed July 22, 1918. Serial No. 246,224.

*To all whom it may concern:*

Be it known that I, JOHN C. MILLER, a citizen of the United States, residing at Toledo, county of Lucas, and State of Ohio, have invented certain new and useful Improvements in Wheel Blocks, of which I declare the following to be a full, clear and exact description.

This invention relates to an improved wheel or chock block and has for its object to provide a block for economically and effectively blocking the wheels of motor auto vehicles during shipment.

A further object of the invention is to provide a block comprising a frame on which is secured a wheel engaging member, which is spaced from the deck or floor on which the frame is adapted to rest.

Still another object of the invention is to provide a block, as above characterized, which is light and durable, and which can be manufactured at a relatively low cost.

The invention is clearly defined and pointed out in the appended claims, and the preferred embodiment thereof is illustrated in the accompanying drawing, in which:—

Figure I is a side elevation of an automobile showing the application of the invention to the wheels thereof.

Figure II is a longitudinal sectional view illustrating the manner of applying the block in blocking position to the wheels of a vehicle.

Figure III is a detail, perspective view of my improved wheel block.

Referring to the drawings, 10 designates the body of an automobile and 11 the wheels thereof, the wheels being provided with the pneumatic tires 13. A deck or floor is indicated at 14 on which the automobile rests. My improved wheel block 15 is positioned at the front and rear of the wheels 11 and secured to the deck or floor 14 whereby the wheels are blocked against movement.

The wheel block or chock block 15 is plainly shown in Figure III and comprises two reversely inclined members 16 and 17 preferably of wood which are secured to each other at their point of intersection, and a wheel engaging member 18 also of wood is secured to the upper end of the inclined member 16. The members 16 and 17 are connected, as shown in Figure II, to form a brace for the wheel which is held by the wheel engaging member 18. The member 17 is preferably longer than the member 16 and the upper end of the member 17 is preferably cut to have a slight incline as indicated at 21. This end 21 of the member 17 engages the side surface 22 of the member 16 adjacent its upper end, and the two members are suitably connected to each other by securing members 23. The wheel engaging member 18 has a base 24' and a curved surface 24, the curved surface being divergent to the base and adapted to fit the contour of an automobile tire. The opposite ends 25 and 26 of the wheel engaging member 18 are parallel and the longitudinal edges 27 of the curved surface 24 are curved and beveled corresponding to the curvature of a tire 13. The wheel engaging member 18 is suitably secured to the member 16 by the securing members 28, which preferably are nails.

In blocking the wheels of an automobile for shipment, a wheel block is positioned at the front and rear of each of the wheels so that the curved surface 24 of the wheel engaging member 18 closely engages the tire 13. The lower ends of the inclined members 16 and 17 are then suitably secured to the floor or deck 14 preferably by spikes as indicated at 29. As is obvious, the wheels are then rigidly blocked against forward or backward movement, and also, held against side movement by the sides of the curved surface 24 of the block engaging member 18.

In the construction of my improved wheel block, the inclined side members 16 and 17, which form the supporting frame of the wheel engaging member 18, can be of any desired width or thickness which will insure the proper seating of the wheel engaging member 18 and support the same against the thrusts of a wheel. A block constructed in this manner reduces the cost thereof, in that the material is of short lengths, and material can be utilized which is not likely to be used for other purposes. Also, the wheel engaging member 18 can be quickly formed as the curved surface 24 is comparatively short. The members of the block can be quickly secured together and, as a whole, the block can be constructed at a relatively low cost in labor and material.

In the above description and accompanying drawings, I have shown and described my improved wheel block when used for blocking the wheels of an automobile during shipment. It is to be understood, however, that the invention is not to be so limited as indicated by the appended claims.

Having thus described my invention, what I claim as new and desire to secure by Letters Patent, is:—

1. A chock block for a vehicle wheel comprising a pair of straight wooden members, means for securing said members together at their ends to form an inverted V, a third member having a curved face to engage the face of said vehicle wheel and means for securing said third member to one of said first members.

2. A chock block for a vehicle wheel comprising a pair of plain straight wooden members, means for securing together adjacent ends of said members to form an inverted V the opposite ends of said members being adapted to be secured to a floor, a wooden block having a flat face and a face curved to engage the periphery of said wheel and means for securing the flat face of said block to the upper portion of one of said members.

In testimony whereof, I affix my signature.

JOHN C. X MILLER.
his mark

Witnesses:
E. B. WHITCOMB,
L. J. LANGENDERFER.